March 13, 1956  A. I. MIHALAKIS  2,737,845
PROJECTION INDICATING AND VIEWING INSTRUMENT ASSEMBLY
Filed March 20, 1951  4 Sheets-Sheet 1
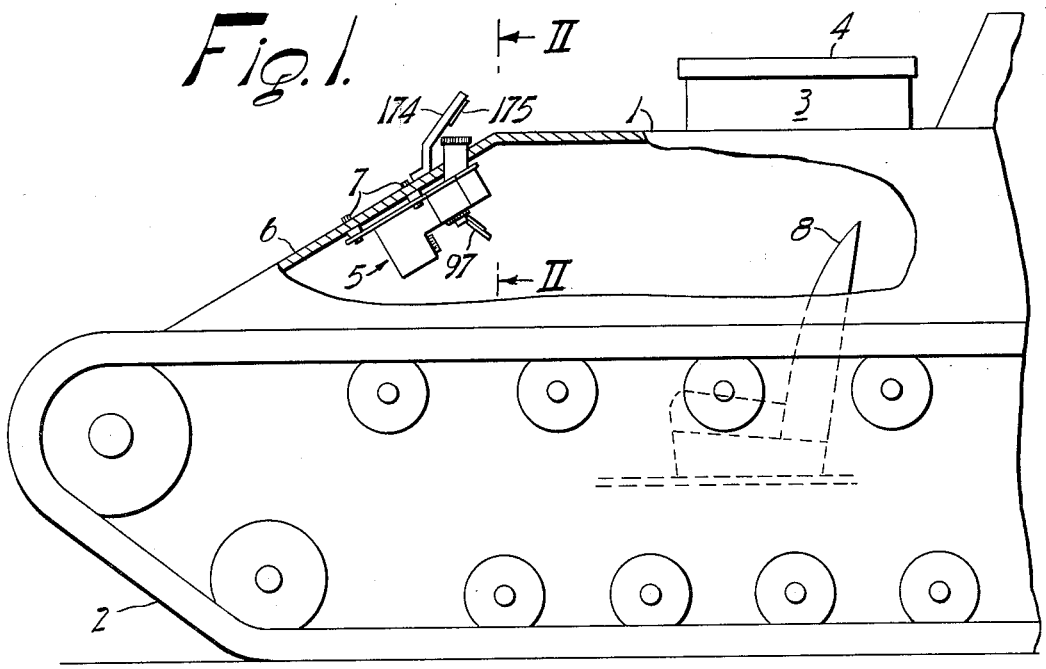
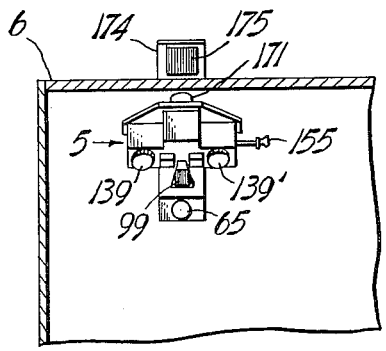
INVENTOR.
Agis I. Mihalakis
BY
Bean, Brooks, Buckley & Bean.
ATTORNEYS

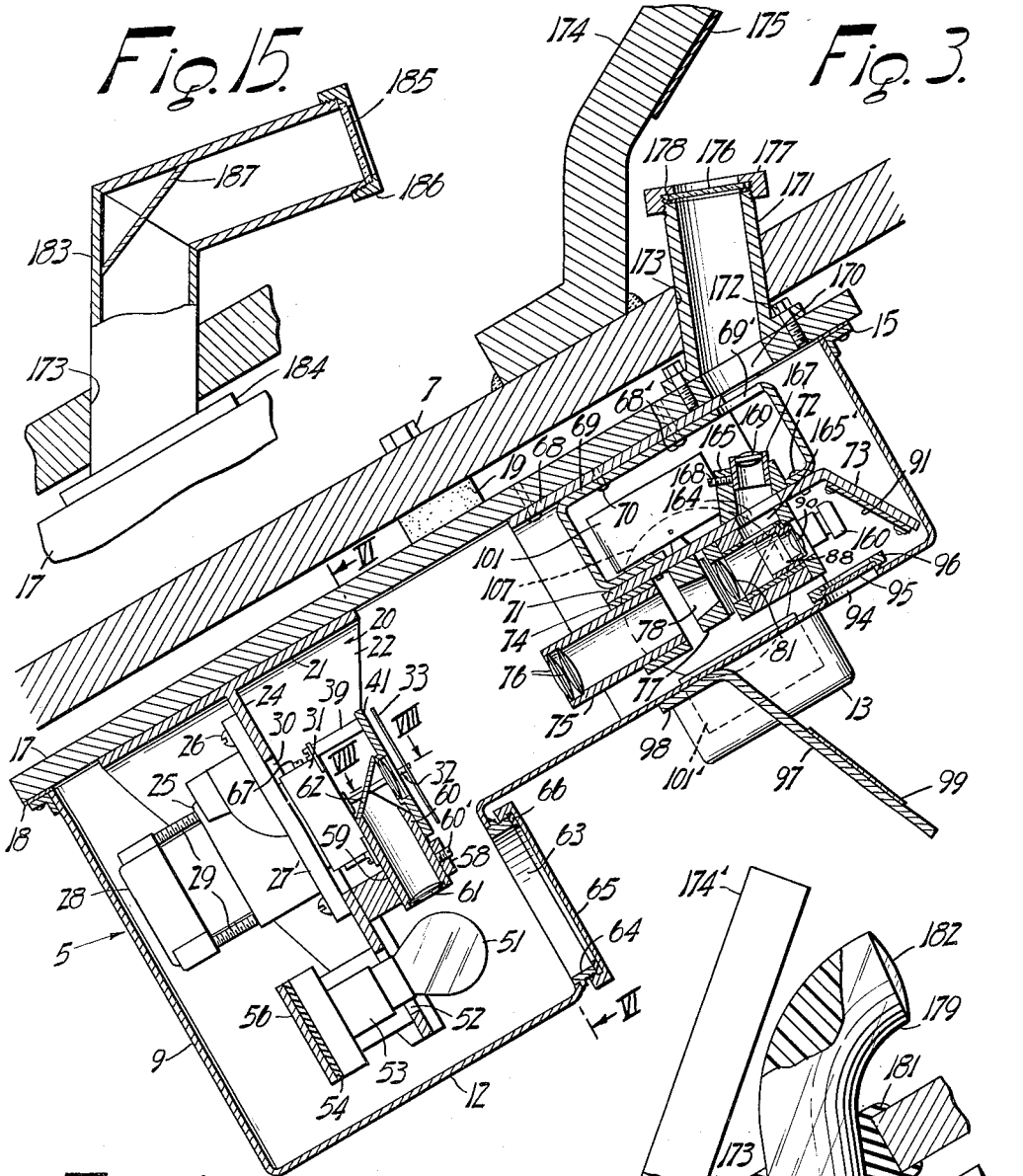
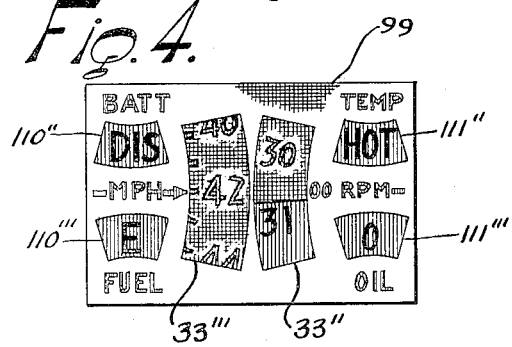
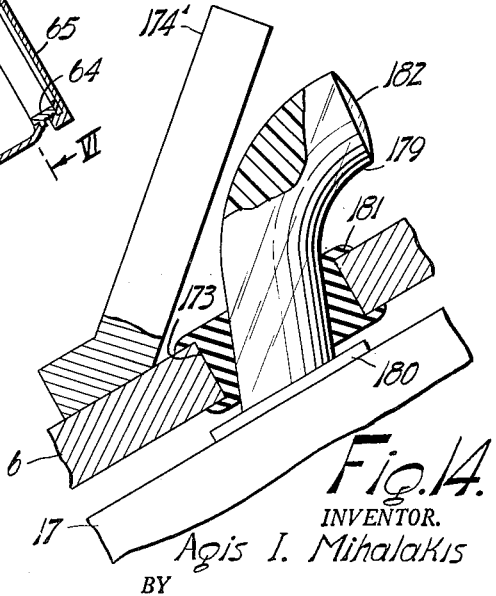

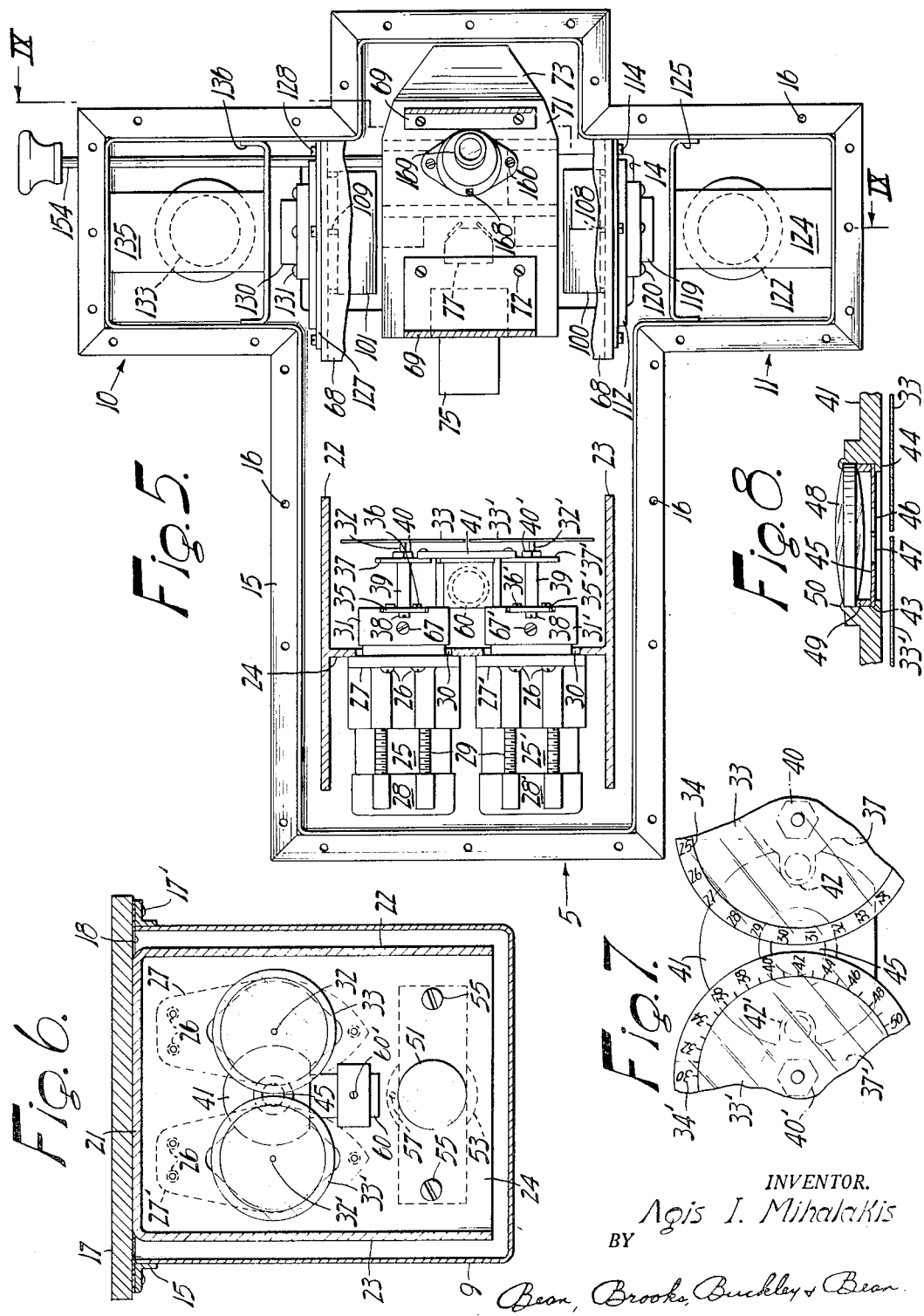

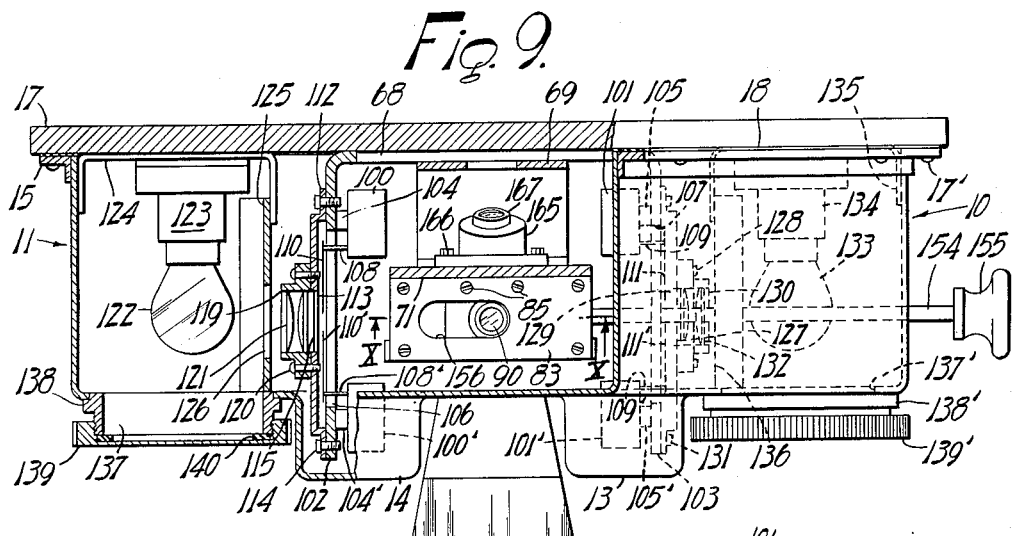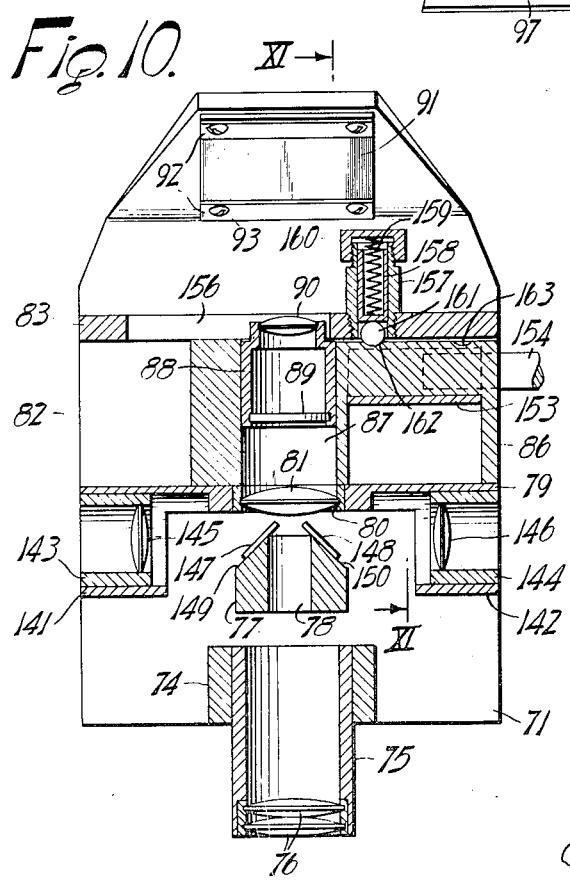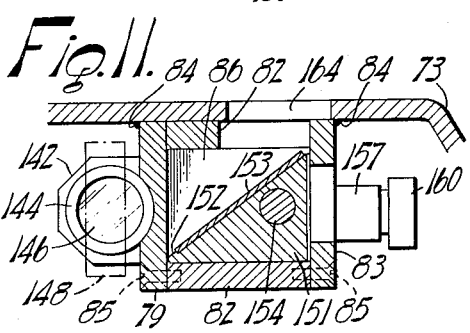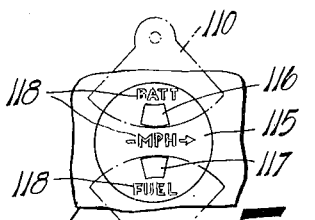

United States Patent Office 2,737,845
Patented Mar. 13, 1956

2,737,845

PROJECTION INDICATING AND VIEWING INSTRUMENT ASSEMBLY

Agis I. Mihalakis, Buffalo, N. Y., assignor to Glowmeter Corporation, Buffalo, N. Y.

Application March 20, 1951, Serial No. 216,647

18 Claims. (Cl. 88—24)

This invention relates generally to the field of instrumentation, and more particularly to an instrument of the type wherein an image of the instrument indication is projected onto a viewing means.

Certain instrument installations are faced with the problem of providing an indication or reading at a plurality of different locations, which problem arises from the fact that the person wishing to know the instrument indication occupies different positions at different times.

One example of such an installation is seen in the case of armored vehicles of the type commonly designated tanks. When not in actual armed combat, it is customary to maneuver a tank in "unbuttoned" condition, that is to say, with the hatch cover open and the driver's or tank commander's head protruding through the hatch opening. While this procedure obviously increases the driver's visibility of surrounding terrain, it possesses a severe disadvantage in that the instrument panel, which is located inside the tank, is not visible to the driver. One result of this undesirable situation is increased difficulty in maintaining a stipulated interval between adjacent tanks when proceeding in column. In such a columnar maneuver, the usual practice is to designate a particular speed and interval and whenever said speed is not maintained exactly, an accordion action takes place with the tanks in the column bunching together and then spreading beyond the specified interval. This accordion action limits and sometimes completely destroys the unit commander's control over the column, especially where hand signals or other visual means are used for control, and means that in the event of a sudden emergency, proper tactical commitment of column is rendered extremely difficult and time consuming.

When maneuvering the tank in "buttoned" condition, with the hatch cover closed, the driver is within the tank and consequently can view the instrument panel. However, certain other problems continue to exist because conventional instruments are of such a nature and often must be so located as to be extremely difficult to read, requiring close scrutiny and observation, and sometimes even a change of position. In addition, conventional instruments are bulky, occupying space which could well be devoted to other uses, and are relatively expensive. Thus, the conventional methods of instrumentation are entirely unsuited to an installation of the type here being considered.

Accordingly, it is an object of this invention to provide an instrument assembly having a plurality of viewing means together with means projecting an instrument reading to any one of said viewing means.

Another object of this invention is to provide a vehicle instrument assembly having viewing means located exteriorly as well as interiorly of the vehicle.

It is also an object of this invention to provide an indicating instrument arranged to project an indicating image to a point remote from the instrument proper where it may be clearly and easily viewed.

A further object of this invention is to provide an instrument assembly wherein a plurality of instrument indications are projected onto a single viewing means of restricted size.

In addition, it is an object of this invention to provide an instrument assembly utilizing a single objective lens system and a single condensing medium arrangement to create and project an image of a plurality of indicating instrument readings.

Another object of this invention is to provide an instrument assembly utilizing a single source of illumination to project images of a plurality of indicating instrument readings.

An additional object of this invention is to provide an indicating instrument utilizing variations in color to emphasize a change in the instrument indication.

A further object is to provide an indicating instrument of the aforementioned type whose reading is clearly visible in daylight as well as in darkness.

Another object of this invention is to provide an instrument assembly wherein only the actual indication is projected onto a viewing means.

It is also an object of this invention to provide an indicating instrument assembly of the foregoing type which is relatively inexpensive to manufacture, compact, rugged, and entirely reliable in operation.

The foregoing and other objects will become apparent upon reading the following detailed description, taken in conjunction with the accompanying drawings wherein like reference numerals identify like parts throughout the various views, and wherein:

Fig. 1 shows the instrument assembly of the present invention mounted in place on a conventional tank, with certain parts in section and with certain parts broken away for convenience of illustration;

Fig. 2 is a front view of the instrument assembly of Fig. 1, taken along the lines II—II of Fig. 1;

Fig. 3 is a side view in section of the instrument assembly of Fig. 1;

Fig. 4 is a view of the image projected by the instrument assembly of Fig. 1 and appearing on the viewing means;

Fig. 5 is a top view of the instrument assembly shown in Fig. 3, with the cover plate thereof removed and with some parts broken away and some parts in section for greater clarity;

Fig. 6 is a sectional view taken along the line VI—VI of Fig. 3;

Fig. 7 is a detailed view of two of the indicia-bearing transparencies utilized in the instrument assembly of the present invention;

Fig. 8 is a sectional view taken along the lines VIII—VIII of Fig. 3;

Fig. 9 is a sectional view taken along the lines IX—IX of Fig. 5;

Fig. 10 is a sectional view taken along the lines X—X of Fig. 9, and showing the means for shifting the projected image from one viewing screen to the other;

Fig. 11 is a sectional view taken along the lines XI—XI of Fig. 10;

Fig. 12 is a detailed view of another of the transparencies utilized in the instrument assembly of the present invention;

Fig. 13 is a view of one of the masking means cooperating with the transparencies to outline a restricted portion thereof.

Fig. 14 is a view of a modified image transmitting and viewing means for use exteriorly of the tank; and Fig. 15 shows still another modified form of transmitting and viewing means for exterior use.

It is to be understood at the outset that while the instrument assembly of the present invention is specifically described and illustrated as adapted for use on an armored vehicle such as a tank, its adaptability is not limited thereto and it is equally well adapted for use on other types of vehicles as well as in stationary installations, as will become apparent.

As shown in Fig. 1, the instrument assembly of the instant invention is located on one wall of a conventional tank 1, which tank is equipped with the usual track 2, hatch 3, and hatch cover 4. Fig. 1 is intended to illustrate the general characteristics of a modern tank without specifying any details thereof, which details in general form no part of the present invention. The instrument assembly of the present invention is shown generally at 5 as being secured on the inside of the sloping front wall 6 of tank 1 by means of bolts 7. The driver's seat is indicated generally at 8, and it will be assumed at present that we are here concerned with only the driver of the tank who must maneuver the same both in "buttoned" and in "unbuttoned" condition. The driver occupies seat 8 when the tank is in "buttoned" condition, as illustrated in Fig. 1, and stands with his head protruding from hatch 3 when cover 4 is raised and tank 1 is in "unbuttoned" condition.

The instrument assembly 5, as shown in Figs. 3 and 5, comprises a housing 9 having winged-shaped portions 10 and 11 at each side thereof, and cup-shaped portions 12, 13 and 14 extending therebeneath. Housing 9 is open at the top thereof, and a flange member 15 extends around the periphery of said open portion, said flange member having a plurality of perforations 16 therein. A cover member 17 fits over said open top portion and is secured to said flange member 15 by appropriate means, such as bolts 17', with a washer element 18 between cover 17 and flange 15. Housing 9 is mounted on wall 6 of tank 1 by means of bolts 7 which extend between cover 17 and said wall, with spacer elements 19 maintaining wall 6 and cover 17 in predetermined spaced relation.

A bracket 20 is mounted on the underside of cover 17 to extend inwardly of housing 9 and cup-shaped portion 12, and comprises a top plate 21, side plates 22 and 23, and a mounting plate 24 extending therebetween. Two instrument casings 25 and 25' are secured on mounting plate 24 by means of bolts 26 extending through mounting brackets 27 and 27' on said respective instruments. Each of said instruments comprises in the instant case a small servomotor, one of said instruments being adapted to indicate engine revolutions and the other of said instruments being arranged to indicate speed, all in a manner to be described. Caps 28 and 28' are fitted over the outer end of each of said instruments 25 and 25' respectively, with bolts 29 extending between said caps and said mounting brackets to maintain the same, together with instruments 25 and 25', in secured relation. The servomotors in said instruments are controlled in a conventional manner, the details of which form no part of the present invention, so as to be responsive to engine revolutions and vehicle speed.

Mounting plate 24 is suitably apertured at 30 whereby to permit the forward portion 31 and 31' of instruments 25 and 25' respectively to extend therethrough, said forward portions including appropriate mechanism for actuating what would normally be the conventional indicating needle. However, in the instant case rotatable shafts 32 and 32' extend forwardly from said portions 31 and 31', and transparent dials 33 and 33' are carried at the outer end of shafts 32 and 32' respectively. Said dials 33 and 33' carry indicia 34 and 34' respectively along the outer periphery thereof, indicia 34 serving to indicate engine revolutions, and indicia 34' serving to indicate vehicle speed, all in a manner to be described.

A plate 35 is secured on the front of forward portion 31 by means of bolts 36, and a similar plate 35' is secured on the front of forward portion 31' by means of bolts 36'. Plates 37 and 37' are secured to plates 35 and 35' respectively by means of bolts 38 extending therebetween, with spacing elements 39 serving to space apart said plates 35 and 37, and 35' and 37'. Bearings 40 and 40' are mounted on plates 37 and 37', respectively, and shafts 32 and 32' are adapted to extend through said respective bearings.

A mounting bracket 41 is secured to ears 42 and 42' on plates 37 and 37', and has a center aperture 43 extending therethrough with a peripheral flange 44 extending around said aperture. A masking member 45, having apertures 46 and 47 therein, fits within aperture 43 and against flange 44, and a collector lens 48 also fits within aperture 43, being spaced from mask 45 by means of a spacer element 49 and being held in position by an annular lip 50 on bracket 41. Apertures 46 and 47 in masking member 45 are adapted to frame limited portions of indicia 34 and 34' respectively for a purpose to be described.

A light source 51 extends through an aperture 52 in the lower portion of mounting plate 24, and is contained within a socket 53. Socket 53 is held on a U-shaped bracket 54 which is secured to mounting plate 24 by means of bolts 55, socket 53 being held on said bracket by means of a strap 56 fitting behind bracket 54 and secured to socket 53 by nuts 57. A bracket 58 extends forwardly of mounting plate 24, being secured thereon in any conventional manner, and has an opening 59 therethrough in which is mounted a tubular casing 60. An adjusting bolt 60' is used to secure tubular casing 60 in bracket 58. Tubular casing 60 has a collector lens 61 in the lower portion thereof, and a highly reflective member 62 extending diagonally across the top thereof, whereby light rays from light source 51 will be collected by lens 61, and reflected by member 62 through lens 48, apertures 46 and 47 in mask 45, and the appropriate indicia on the discs 33 and 33'. In this manner, appropriate portions of the indicating indicia on discs 33 and 33' are illuminated. Images thereof are projected forwardly in housing 9 in a manner to be described.

The cup-shaped portion 12 of housing 9, in which portion is located light source 51, has an aperture 63 in the wall forward of said light source. A mounting ring 64 extends around aperture 63, and a cover plate 65 threadedly engages said mounting ring with a sealing ring 66 fitting therebetween. With this arrangement, entry into housing 9 for the purpose of changing the bulb of light source 51 is facilitated, since one need merely unscrew cover 65 and reach in through aperture 63. Also, adjusting screws 67 and 67' are provided in instrument portions 31 and 31' respectively, which adjusting screws can be reached by removing cover 17, whereby to facilitate adjustment of instruments 25 and 25'.

Images of the indicia above referred to, together with other images, are projected onto a viewing means in the following manner.

A mounting plate 68 is located in the forward portion of housing 9, being secured to the underside of cover 17 by means of screws 68', and a U-shaped bracket 69 is secured at its midportion to mounting plate 68 by means of screws 70. A plate 71 is secured to the ends of bracket 69 by a plurality of screws 72, and is bent downwardly at its forward end portion 73. Plate 71 carries a tubular bracket 74 at its other end portion, said tubular bracket encircling an optical system comprising a tubular member 75 having a plural objective lens 76 in the outer end thereof. A member 77 is secured on plate 71 forwardly of bracket 74, and has a tapered aperture 78 extending therethrough, with aperture 78 and lens 76 being so aligned that images of the illuminated portions of indicia 34 and 34' will pass therethrough. A mounting plate 79 is secured to plate 71 forwardly of member 77, and has an aperture 80 therein in which is secured a lens 81. Lens 81 is aligned with aperture 78 in member 77 to intercept the projected image previously referred to. A second member 82 is mounted on plate 71 with one side in abutting relation with plate 79, and a third plate 83 is secured to mounting plate 71 in abutting relation with the other side of plate 82. Plates 79 and 83 are secured to plate 71 by welding as at 84, and are secured to plate 82 by means of bolts 85.

Plate 82 has a hollow interior, in which is movably mounted a member 86. Member 86 has a cylindrical opening 87 extending therethrough longitudinally of plate 71, and a lens casing 88 is adjustably mounted therein. A color filter 89 is secured at the rearward end of casing 88, and an objective lens 90 is secured at the forward end thereof, and, when in the position illustrated in Fig. 10, lens 90 is aligned with lens 81. A reflecting member 91 is mounted on the underside of end portion 73 of plate 71, being enclosed in brackets 92 secured to said end portion by means of bolts 93. The bottom of housing 9, at a point approximately beneath end portion 73 of plate 71, has an opening 94 therein, which opening 94 is covered by a transparent member 95 held in place by a bracket 96. Beneath housing 9 there is a downwardly extending bracket 97 having a flanged portion 98 which is secured to said housing, and a viewing screen 99 is secured on the forward side of said downwardly extending bracket 97. The arrangement of these parts is such that the image of the illuminated portions of discs 33 and 33' will be projected forwardly through lens 76, aperture 78, lens 81, filter 89, and lens 90, and will be reflected by member 91 through transparent member 95 and onto viewing screen 99.

In addition to the instruments 25 and 25' previously described, a plurality of instruments 100, 100', 101 and 101' are mounted on opposite sides of plate 71. Each of these instruments are of the type previously described, and are arranged to be responsive to battery discharge, fuel supply, coolant temperature and oil pressure, although of course they may be of any conventional type and arranged to be responsive to virtually any condition. These instruments are secured to bracket member 68, being attached to the depending side flanges 102 and 103 thereof by means of elements 104 and 104' and 105 and 105' extending between the respective instruments and side flanges. It will be noted that side flanges 102 and 103 extend into cup-shaped portions 14 and 13 respectively. Flange 102 has a central aperture 106 extending therethrough, and flange 103 has a corresponding aperture 107 extending therethrough. Rotatable shafts 108 and 108', 109 and 109' are operatively connected to instruments 100, 100', 101 and 101' respectively, and extend through apertures 106 and 107, said rotatable shafts carrying segment shaped discs 110, 110', 111, and 111' respectively on the outer ends thereof. Segment shaped members 110, 110', 111 and 111' have transparent portions bearing indicia thereon such as shown in Fig. 12, which indicia is adapted to provide an indication of the condition to which the corresponding instrument is responsive, such as coolant temperature, oil pressure, and the like.

A bracket 112 having an aperture 113 therein is secured across aperture 106 in side flange 102 by means of bolts 114, said aperture 113 containing a mask 115 therein. Mask 115 is apertured, as at 116 and 117, to outline restricted portions of the transparent parts of segment shaped members 110 and 110' and thus frame the appropriate indicia indication, and in addition has appropriate indicia 118 formed by cut-out portions therein to act as labeling means for certain of the indications. Thus, indicia 118 provides the labels "BATT," "FUEL" and "MPH," the latter including an arrow. A lens casing 119 is secured on bracket 112 by means of bolts 120, and contains a plural condenser and collector lens 121. A light source 122 is secured within a socket 123 which is mounted on a U-shaped bracket 124 within wing 11, and a plate 125 having an aperture 126 therein is secured to bracket 124 with aperture 126 between light source 122 and lens 121. The arrangement of these parts is such that light rays emanating from light source 122 pass through lens 121 and apertures 116 and 117 in mask 115 to illuminate the appropriate indicia on segment members 110 and 110'. In addition, the said light rays will illuminate labeling 118, and images of these indicia and labeling are projected onto viewing means 99 in a manner to be described. If desired, instead of using an opaque member with cut-out portions and apertures, mask 115 can comprise a transparency with appropriate blacked-out portions.

Similarly, a bracket 127 extends over aperture 107 in side flange 103 of plate 68, being secured to said flange by appropriate screw means 128 and having an aperture 129 therein. A lens casing 130 is secured to bracket 128 by means of screws 131, and contains a plural lens 132. A light source 133 is secured in wing 10 of housing 9, being mounted in a socket 134 which is secured to a U-shaped bracket 135. A plate 136 is secured to bracket 135, and is suitably apertured in line with light source 133 and lens 132. Bracket 127 contains a masking member, not illustrated, which is identical with mask 115 except that the labeling indicia thereon provides the labels "TEMP," "OIL" and "00 RPM," the latter including a horizontal line therethrough, as shown in the right-hand side portion of Fig. 4. Thus, light rays emanating from light source 133 will pass through the aperture, not illustrated, in plate 136, lens 132, and the apertures in the mask, not illustrated, to illuminate the appropriate indicia indications on segment members 111 and 111'. In addition, the said light rays will pass through the labeling on the mask to illuminate the same. Images of these illuminated indicia are projected onto the viewing means in a manner to be described. It should be noted that the labeling indicia is located either between the segment members, or aligned with the transparent portions thereof, as shown in Fig. 13.

In addition, wings 10 and 11 of housing 9 are suitably apertured as at 137 and 137', which apertures are encircled by annular rings 138 and 138' respectively. Covers 139 and 139' threadedly engage rings 138 and 138' respectively, with sealing rings therebetween as illustrated at 140. This arrangement facilitates the replacement of light sources 122 and 133.

Images 110", 110''', 111" and 111''' of the illuminated indicia on segment members 110, 110', 111 and 111', respectively, are projected onto viewing means 99 in the following manner. Plate 79 has rearward extensions 141 and 142 on each side thereof, as shown in Fig. 10, which extensions are suitably bored to receive tubular lens mountings 143 and 144 respectively. Mountings 143 and 144 contain an objective lens 145 and 146 respectively, lens 145 being aligned with lens 121, and lens 146 being aligned with lens 132. Thus, images of the appropriate indicia on the transparent portions of segment shaped members 110 and 110', together with an image of labeling indicia 118 on mask 115, are projected by lens 145, and images of the appropriate indicia on the transparent portions of segment shaped members 111 and 111', together with an image of the labeling indicia on the corresponding masking means, are projected by lens 146. These images are intercepted by reflecting members 147 and 148 respectively, which reflecting members are mounted on appropriately beveled surfaces 149 and 150 of member 77, the arrangement being such that the projected images referred to immediately above will be reflected by members 147 and 148 through lens 81, filter 89, lens 90, and from member 91 onto a viewing screen 99, all in the manner previously described.

Thus, images are created of appropriate portions of the indicating indicia operatively carried by each of the six illustrated instruments, which images are projected in the manner previously described by an optical system, wherein they are combined into a single image, onto viewing screen 99. The images 33" and 33''' of indicia 34 and 34' on transparencies 33 and 33' pass through aperture 78 in member 77, and from there through lens 81, filter 89 and lens 90, thus occupying a center position relative to the other images. The images of the indicating indicia carried by instruments 100 and 100' and the images of the indicating indicia carried by instruments 101 and 101', are projected onto reflecting members 147 and 148 respectively, which reflecting members are located on either side of aperture 78 in member 77, whereby these four last-named images will be projected through lens 81, filter 89 and lens 90 on each side of the two previously mentioned images. These six images actually combine to form a single image, which single image is reflected from member 91 through transparent member 95 and onto screen 99, on which it will appear as shown in Fig. 4.

It will be noted that the labeling indicia on the masks associated with instruments 100, 100', 101 and 101' are so arranged that the images formed thereby provide labels for all six of the indicating images. Thus, the letters MPH with an arrow indication appear adjacent the speed indicating image, and the letters RPM with two cyphers to indicate hundreds and with a line therethrough appear adjacent the tachometer indication image. Similarly, the labels "BATT," "FUEL," "TEMP," and "OIL" appear adjacent the appropriate image. In this way, appropriately labeled readings of six vital indicating instruments are projected in image form onto a viewing screen which is located well within the field of vision of the driver of the tank when it is maneuvering in "buttoned" condition. Also, it should be noted that the projected image presents only the actual instrument indication, whereby it is not necessary to scan an entire dial face to determine what the reading is.

In addition, the present invention provides means whereby this image can be viewed exteriorly of the tank as required when maneuvering in "unbuttoned" condition. To this end, block 86 is made movable within plate 82, and includes, in addition to cylindrical opening 87, a portion 151 arranged with its upper surface 152 inclined in an upward direction. Portion 151 is located just adjacent opening 87, and the inclined surface 152 thereof is covered with a highly reflective member 153. A manually operable handle 154 extends outwardly from portion 151 and has a knob 155 on the outer end thereof, the arrangement being such that whenever handle 154 is pushed inwardly block 86 will be moved transversely of plate 71 to place reflective member 153 in the path of the image passing through lens 81. Plate 83 is appropriately slotted as at 156 whereby lens casing 88 is freely slidable therein.

A restraining member comprising a casing 157 is threadedly secured in plate 83, and has a cup-shaped member 158 therein. A spring 159 extends between cup-shaped member 158 and a cover 160 which threadedly engages the outer end of casing 157, and a spherical ball-shaped member 161 sits within casing 157 between the lower end of member 158 and portion 151. The forward end of portion 151 has two detents 162 and 163 therein, said detents being arranged so that the spring-pressed spherical member 161 will engage detent 162 when block 86 is in the position illustrated in Fig. 10 with the projected image passing through filter 89 and lens 90, and will engage detent 163 when block 86 has been moved so that reflective member 153 intercepts said projected image.

Plate 71 has an opening 164 therein at a point above reflecting member 153, and an inclined tubular lens casing 165 is secured over said opening and to the top portion of said plate by means of bolts 166. Member 82 has a similar opening 165' between opening 164 and member 153. A lens mounting member 167 is adjustably secured in place within casing 165 by means of a bolt 168, and contains an objective lens 169. Cover 17 has an opening 170 therein, and a tubular extension 171 is secured to the top of said cover by means of bolts 172, which tubular extension extends through an opening 173 in tank wall 6. A mounting bracket 174, preferably formed of armor plate, is secured to the outer surface of wall 6 in any appropriate manner, and has secured thereon a screen 175 which screen is identical with screen 99 except that it too is preferably formed of armor plate. Screen 175 is preferably detachably secured to bracket 174, whereupon if said screen should become damaged it would be easily replaceable, and any conventional means, such as a tongue and groove arrangement, can be used for this purpose. A transparent member 176 is mounted on the end of tubular extension 171 by means of a nut 177 which threadedly engages said extension, and a sealing ring 178 fits between extension 170 and member 176. The arrangement is such that, when block 86 has been moved so that reflective member 153 intercepts the projected image, said image is reflected through openings 165' and 164, objective lens 169, opening 170, transparent member 176 and onto viewing screen 175, as clearly shown in Fig. 3. Of course, mounting bracket 69 is suitably apertured, as at 69', whereby said image will pass therethrough.

Therefore, it is seen that whenever tank 1 is being maneuvered in "unbuttoned" condition, the driver or operator need only push in on knob 155 whereupon to move block 86 so that reflective member 153 intercepts the projected image passing through lens 81. This projected image, which is a combination of the images of all six instrument indications as well as the various labeling means, is reflected from reflecting plate 153 onto screen 175 which screen, as will be seen from Fig. 1, is arranged to be within the field of vision of a person looking out over hatch 3. The image appearing on screen 175 is the same as that appearing on screen 99, and is illustrated in Fig. 4.

A modified means adapted for projecting an indication exteriorly of the tank is shown in Fig. 14, wherein tubular extension 171 is dispensed with and a rod 179 formed of a methacrylate resin is substituted in place thereof. Rod 179 has a flanged lower portion 180, which flanged portion is secured to cover 17 in any appropriate manner, and extends through opening 173 in wall 6, being secured therein by means of a grommet 181. In addition, rod 179 is bent so that its outer end presents a surface substantially transverse to wall 6. A bracket 174' is placed on wall 6, as illustrated, and acts as a shield for rod 179. Methacrylate resins have the property of being able to transmit light for a considerable distance, and even around corners, without losing any of such light. However, if the light strikes a surface which is roughened or otherwise configurated, it will pass therethrough. Therefore, end 182 of rod 179 is appropriately ground or otherwise configurated to form a viewing screen. Thus, member 153 can be restricted to receive only one area of the projected light which may be colored as described hereinafter, and this colored area is reflected from member 153, passes through openings 165' and 164, lens 169, aperture 69', opening 170 and into rod 179 through which it is transmitted until it strikes end 182, at which point it will become visible and provide a colored light indication, with end 182 acting as a viewing screen. By utilizing a transparency having differently colored portions, the existence or nonexistence of a predetermined desired condition can be determined by viewing the color appearing at 182.

A further modification of the means for projecting the image exteriorly of the tank is shown in Fig. 15, wherein a path-defining member comprising a casing 183 extends from cover 17 through opening 173. Casing 183 has a flange 184 located at its lower end, which flange is secured to cover 17 by any conventional means, and casing 183 is bent sharply at a point exteriorly of tank 1 whereby its outer end faces in the direction of the line of sight from hatch 3. A translucent member 185 is appropriately ground or otherwise roughened to form a viewing screen, and is held in place on the outer end of casing 183 by means of a bracket 186. A mirror 187, or other highly reflecting surface, extends diagonally across the bend in casing 183, whereby the projected image will be reflected to pass through member 185. Thus, the image reflected from member 153 will pass through openings 165' and 164, objective lens 169, aperture 69', opening 170, and path-defining member 183, being reflected by mirror 187 through translucent member 185, which translucent member acts as a screen on which the image is viewed. An armor plate member, similar to members 174 and 174', can be used to shield casing 183.

It should be noted that light sources 51, 122 and 133 are preferably two-filament lamps, with the two filaments capable of surviving different degrees of shock. Then, if one filament is destroyed by shock, the other filament will continue operating to produce an instrument presentation which is readable, even though of lower intensity. If desired, means can be provided to automatically increase the intensity of the remaining filament. In any event, the present invention is designed to continue producing an image of all six instrument indications despite severe shocks imposed upon the illuminating system.

Also, while the present invention is shown as producing an image of six instrument indications, many more instruments could be added without rendering the entire assembly unwieldy. Because of the manner in which the various images are created and projected, the instruments can be of reduced size and an amazing number of images can be projected onto a screen of unbelievably restricted size, with each image remaining clear and distinct. For example, the combined image of Fig. 4 can be projected onto an area of one-half of a square inch and still retain an extraordinary degree of legibility. However, it is recommended that a screen having an area approximating that of a conventional tachometer dial be used. In this regard, it is noted that a single light source is used to produce two different images, with a total of three light sources used in combination with six different instruments, and these light sources are of relatively low wattage. The saving in space and electrical energy is obvious and, if desired, an even greater number of images of different instrument indications could be produced from a single light source. Also, only a single objective lens system is necessary in combination with a plurality of instruments, and the same is true of the condensing medium. To restate this, the present invention utilizes one objective lens system and one condensing medium arrangement to project an indicia image of a plurality of indicating instruments. This feature provides a saving in both space and expense.

Viewing screens 99 and 175 are especially designed for use in instrument installations such as that of the present invention, and are of the type disclosed in copending application Serial No. 162,851, for a Reflecting Screen, filed May 19, 1950, by Agis I. Mihalakis. Thus they each comprise a reflecting screen having a surface formed with an infinite number of parallel microscopic grooves and ridges covered with a light reflective coating. In addition, screen 175 is preferably made of armor plate whereby it is capable of withstanding extreme abuse and harsh treatment, while still retaining its value as a viewing means. It is not impaired by mud, snow, ice, rain and the like, can be cleaned by merely wiping, and is designed to be easily replaceable.

Furthermore, the present invention utilizes variations in color to aid in indicating when an undesirable or dangerous change in an instrument indication has occurred. As shown in Fig. 12, the transparent portion of segment-shaped member 111 has opaque indicia provided with a transparent background. However, a portion 188 of said transparent portion is reversed, with transparent indicia on an opaque background. Portion 188 covers that section of the indicating indicia which represents an optimum condition. Each of the other segment-shaped members 110, 110' and 111' are similarly arranged, with transparent indicia on an opaque background to represent an optimum condition. In similar manner, disc 33 will be provided with transparent indicia on an opaque background representing optimum conditions, and with opaque indicia on a transparent background throughout the remainder of its indicating range. Since there is no predetermined optimum speed, all of the speed indicating indicia 34' will be transparent on an opaque background. Of course, if a predetermined optimum speed were decided upon, it could be indicated in the above manner.

As previously indicated, a color filter 89 is interposed between lens 81 and lens 90, and the projected image passes through this filter. Therefore, the image appearing on screen 99 will comprise either colored indicia on an opaque background or opaque indicia on a colored background. Any color can be used, but for purposes of the present installation red is preferred.

The net effect of using color in the manner indicated is twofold. Firstly, a variation from the optimum in any instrument indication will be accompanied by a reversal in the color combination of the corresponding image, and this variation in color will warn the driver that an undesirable change has taken place. Further, the arrangement is such that when all of the instruments indicate an optimum or desired condition, each of the six images will show indicia of the same predetermined color on an opaque background. Thus, the complete image shown in Fig. 4, will be uniform as to color and background. Then, if any instrument indication varies from its optimum, part of the image shown in Fig. 4 will vary from said predetermined color and background arrangement, and this variation will indicate that a change has occurred. Thus, variations in color, as well as indicia, are utilized to indicate a change in an instrument indication.

As an alternative to using color filter 89, each of the indicia bearing transparencies can be appropriately colored. With such an arrangement, the image appearing on screen 175 will also be colored. Of course, a color filter can be provided in tubular extension 171. Also, if desired, a separate colored disc having a restricted portion of different color could be mounted on shaft 32' to rotate with disc 33', and means could be provided to adjust the said restricted portion to coincide with any desired speed indicating indicia 34'. In this manner a color variation could be used to indicate any variation from a desired speed.

Also, it should be noted that although only two viewing screens have been disclosed, other viewing screens differently located, could be provided. Thus, an additional viewing means could be located within hatch 3, or at any other point within the vehicle.

Thus, it is apparent that the present invention fully accomplishes its aforesaid objects, and provides an instrument installation which is compact, relatively inexpensive, and entirely reliable in operation. The condition responsive mechanisms can be located at any convenient point, even though remote from the various viewing means, and a clear and distinct image of the various instrument indications can be projected to viewing means located both exteriorly and interiorly of the vehicle. By reason of the type of viewing screen used, a clear and distinct image is produced in daylight as well as in darkness. Also, since only the actual reading or indication is projected onto the viewing means, it is not necessary to scan an entire dial face as in conventional instruments.

Although only a few modifications of the present invention have been disclosed, the invention is not to be limited thereto. Other modifications will become apparent to those skilled in the art, and it is intended that this invention be limited only by the scope of the appended claims.

Having fully disclosed the present invention and completely described its mode of operation, what is claimed as new is as follows:

1. An instrument assembly comprising an indicating instrument having a movable light-transmitting indicia-bearing member operable thereby, first viewing screen means spaced from said indicia-bearing member, second viewing screen means spaced from said first viewing screen means and from said indicia-bearing member, objective lens means interposed between said indicia-bearing member and said first and second viewing screen means and optically aligned therewith for focusing the indicia on said first and second viewing screen means, illuminating means in operative alignment with said indicia-bearing member and said objective lens means for causing an indicia image to be projected through a first path onto said first viewing screen means, said second viewing screen means being positioned out of operative alignment with said indicia-bearing member and said illuminating means, and a light-deflecting member having a specular light-reflecting surface movable from an inoperative position to a position in said first path and in operative alignment with said second viewing screen means for reflecting said indicia image onto said second viewing screen means.

2. In combination with a vehicle, an instrument assembly comprising an indicating instrument device carried by said vehicle and operatively connected to an operating element of said vehicle, said instrument device having a movable light-transmitting indicia-bearing member, first viewing screen means positioned in a first field of observation, objective lens means interposed between said first viewing screen means and said indicia-bearing member and optically aligned therewith for focusing the indicia on said first viewing screen means, illuminating means operatively aligned with said indicia-bearing member and with said objective lens means, whereby an indicia image will be projected through a first path onto said first viewing screen means, second viewing screen means positioned in a second field of observation spaced from said first field, a light-deflecting member carried by said vehicle and having a specular light-reflecting surface movable from an inoperative position to a position interposed in said first path in operative alignment with said indicia-bearing member and said second viewing screen means, and objective lens means interposed between said second viewing screen means and said indicia-bearing member and operatively aligned therewith for focusing the indicia on said second viewing screen means, whereby said indicia image can be diverted through a second path onto said second viewing screen means.

3. A vehicle instrument assembly as set forth in claim 2, wherein said first and second viewing screen means are opaque with highly light-reflective viewing surfaces.

4. A vehicle instrument assembly as set forth in claim 2, wherein said first and second viewing screen means are translucent.

5. In combination with a vehicle, an instrument assembly comprising an indicating instrument device carried by said vehicle and operatively connected to an operating element of said vehicle, said instrument device having a movable light-transmitting indicia-bearing member, first viewing screen means positioned in a first field of observation interiorly of said vehicle, objective lens means interposed between said first viewing screen means and said indicia-bearing member and operatively aligned therewith for focusing the indicia on said first viewing screen means, illuminating means operatively aligned with said indicia-bearing member and with said objective lens means, whereby an indicia image will be projected through a first path onto said first viewing screen means, second viewing screen means positioned in a second field of observation exteriorly of said vehicle, means defining an aperture in the vehicle body, a light-deflecting member carried by said vehicle and having a specular light-reflecting surface movable from an inoperative position to a position interposed in said first path in operative alignment with said aperture and with said second viewing screen means, and objective lens means interposed between said second viewing screen means and said indicia-bearing member and operatively aligned therewith for focusing the indicia on said second viewing screen means, whereby said indicia image can be diverted through a second path onto said second viewing screen means.

6. In combination with a vehicle, an instrument assembly comprising an indicating instrument device carried by said vehicle interiorly thereof and operatively connected to an operating element of said vehicle, said instrument device having a movable light-transmitting indicia-bearing member, viewing screen means positioned exteriorly of said vehicle, means defining a light passage through the vehicle body, means including objective lens means interposed between said viewing screen means and said indicia-bearing member and operatively aligned therewith and with said light passage for focusing the indicia on said viewing screen means, and illuminating means operatively aligned with said indicia-bearing member and with said objective lens means, whereby an indicia image will be projected through said light passage and onto said viewing screen means.

7. A vehicle instrument assembly comprising an indicating instrument mechanism carried by said vehicle and connected to a functioning element thereof, said instrument mechanism having a movable light-transmitting indicia-bearing member, viewing screen means positioned in a field of observation spaced from said indicia-bearing member, objective lens means interposed between said indicia-bearing member and said viewing screen means and operatively aligned therewith for focusing the indicia on said viewing screen means, a source of illumination operatively aligned with said indicia-bearing member and with said objective lens means, and masking means operatively associated with said indicia-bearing member and having an aperture therein operatively aligned with said source of illumination and with said objective lens means, whereby an image of a restricted portion only of the indicia will be projected onto said screen means.

8. A vehicle instrument assembly as set forth in claim 7, wherein said masking member is cut out to provide indicia forming a part of the projected indicia image.

9. A projection type instrument assembly comprising, in combination, a plurality of indicating instrument mechanisms each having a movable light-transmitting indicia-bearing member, viewing screen means spaced from said indicia-bearing members, objective lens means interposed between said viewing screen means and said indicia-bearing members and operatively aligned therewith for focusing the indicia of each of said members on said viewing screen means, illuminating means operatively aligned with said indicia-bearing members and with said objective lens means, and a unitary masking member apertured in operative alignment with each of said indicia-bearing members and with said objective lens means, whereby a restricted indicia image of each of said members is projected onto said viewing screen means.

10. A projection type instrument assembly comprising, in combination, a plurality of indicating instrument devices each having a movable light-transmitting indicia-bearing member, viewing screen means spaced from said indicia-bearing members, a single objective lens system interposed between said indicia-bearing members and said viewing screen means and operatively aligned therewith for focusing the indicia of each of said members on said screen means, and illuminating means operatively aligned with each of said indicia-bearing members and with said objective lens system, whereby an indicia image of each of said indicia-bearing members is projected onto said viewing screen means.

11. A projection type instrument assembly comprising, in combination, a plurality of indicating instrument devices each having a movable light-transmitting indicia-bearing member, viewing screen means spaced from said indicia-bearing members, means including objective lens means interposed between said indicia-bearing members and said viewing screen means and operatively aligned therewith for focusing the indicia of each of said members on said screen means, and a single light source operatively aligned with all of said indicia-bearing members and with said objective lens means, whereby an indicia image of each of said indicia-bearing members is projected onto said viewing screen means.

12. A projection type instrument assembly comprising, in combination, an indicating instrument device having a movable light-transmitting indicia-bearing member, said member comprising light-transmitting indica on an opaque background alternating with opaque indicia on a light-transmitting background, viewing screen means spaced from said indicia-bearing member, objective lens means interposed between said indicia-bearing member and said viewing screen means and operatively aligned therewith for focusing the indicia on said screen means, and illuminating means operatively aligned with said indicia-bearing member and with said objective lens means, whereby an indicia image will be projected onto said viewing screen means and whereby a variation in the instrument indication will be accompanied by a variation in the indicia-background arrangement of the indicia image projected onto said screen means.

13. A projection type instrument assembly comprising, in combination, a plurality of indicating instrument devices each having a movable light-transmitting indicia-bearing member, said indicia-bearing members each comprising opaque indicia on light-transmitting backgrounds alternating with light-transmitting indicia on opaque backgrounds, viewing screen means spaced from said indicia-bearing members, objective lens means interposed between said indicia-bearing members and said viewing screen means and operatively aligned therewith for focusing the indicia of each of said members onto said viewing screen means, and illuminating means operatively aligned with said indicia-bearing members and with said objective lens means, whereby an indicia image of each of said members is projected onto said viewing screen means, said indicia-bearing members each having an identical indicia-background arrangement for a predetermined indication of its associated instrument device, whereby when each of said instrument devices provides its predetermined indication the projected images will all have the same indicia background arrangement, and whereby whenever any of said instrument devices deviates from its predetermined indication such deviation will be indicated by the accompanying variation in indicia background.

14. A projection type instrument assembly comprising, in combination, a plurality of indicating instrument devices each having a movable light-transmitting indicia-bearing member, each of said indicia-bearing members comprising indicia-bearing portions of one color alternating with indicia-bearing portions of another color, and all of said indicia-bearing members having an indicia portion of the same color representing a predetermined instrument indication, viewing screen means spaced from said indicia-bearing members, objective lens means interposed between said indicia-bearing members and said viewing screen means and operatively aligned therewith for focusing the indicia of each of said members on said screen means, and illuminating means operatively aligned with each of said indicia-bearing members and with said objective lens means, whereby an indicia image of each of said members is projected onto said viewing screen means, and whereby when all of said instrument devices provide said predetermined indication all of the projected indicia images will be of the same color, and whereby whenever any of said instrument devices deviates from such predetermined indication such deviation will be immediately evident by an accompanying variation in the color of its indicia image.

15. In combination with a vehicle, an instrument assembly comprising an indicating instrument device carried by said vehicle and operatively connected to a functioning element thereof, said instrument device having a movable light-transmitting member comprising alternating portions of different colors, first viewing screen means positioned in a first field of observation spaced from said member, objective lens means interposed between said first viewing screen means and said member and optically aligned therewith for focusing said member on said first viewing screen means, illuminating means operatively aligned with said member and with said objective lens means, whereby a color image will be projected through a first path onto said first viewing screen means, second viewing screen means positioned in a second field of observation spaced from said first field of observation and from said member, a light deflecting member carried by said vehicle and having a specular light reflecting surface movable from an inoperative position to a position interposed in said first path in operative alignment with said second viewing screen means, and a light-transmitting member composed of a methacrylate resin extending between said light deflecting member in its operative position and said second viewing screen means, whereby the projected color area can be directed through said member of methacrylate resin to said second viewing screen means.

16. A projection type instrument assembly comprising an indicating instrument mechanism having a movable light-transmitting indicia-bearing member, viewing screen means positioned in a field of observation spaced from said indicia-bearing member, objective lens means interposed between said indicia-bearing member and said viewing screen means and operatively aligned therewith for focusing the indicia on said viewing screen means, a source of illumination operatively aligned with said indicia-bearing member and with said objective lens means, and masking means operatively aligned with said indicia-bearing member and having an aperture therein operatively aligned with said source of illumination and with said objective lens means, said masking member being provided with indicia forming a part of the projected image, whereby an image of a restricted portion only of the indicia will be projected onto said screen means.

17. A vehicle instrument assembly comprising, in combination, a plurality of indicating instrument devices operatively connected to functioning elements of said vehicle and each having a movable light-transmitting indicia-bearing member, viewing screen means spaced from said indicia-bearing members, means including objective lens means interposed between said indicia-bearing members and said viewing screen means and operatively aligned therewith for focusing the indicia of each of said members on said screen means, a single light source operatively aligned with all of said indicia-bearing members and with said objective lens means, and a condensing lens system interposed between said light source and said indicia-bearing members in operative alignment therewith, whereby an indicia image of each of said indicia-bearing members is projected onto said viewing screen means.

18. A vehicle instrument assembly comprising, in combination, an indicating instrument device connected to a functioning element of said vehicle and having a movable indicia-bearing member, said member comprising transparent colored indicia on an opaque background alternating with opaque indicia on a transparent colored background, viewing screen means spaced from said indicia-bearing member, objective lens means interposed between said indicia-bearing member and said viewing screen means and operatively aligned therewith for focusing the indicia on said screen means, and illuminating means operatively aligned with said indicia-bearing member and with said objective lens means, whereby an indicia image will be projected onto said viewing screen means and whereby a variation in the instrument indication will be accompanied by a variation in the indicia-background arrangement of the indicia image projected onto said screen means.

References Cited in the file of this patent

UNITED STATES PATENTS

| | | |
|---|---|---|
| 1,572,671 | Meyers | Feb. 9, 1926 |
| 1,760,163 | Morris | May 27, 1930 |
| 2,041,194 | Lindenberg | May 19, 1936 |
| 2,051,593 | Curtis | Aug. 18, 1936 |
| 2,178,637 | Link | Nov. 7, 1939 |
| 2,191,045 | Slayton | Feb. 20, 1940 |
| 2,264,044 | Lee | Nov. 25, 1941 |
| 2,365,613 | Wimber et al. | Dec. 19, 1944 |
| 2,382,631 | Harasta | Aug. 14, 1945 |
| 2,453,336 | Orser | Nov. 9, 1948 |
| 2,471,800 | Von Mulinen | May 31, 1949 |